US010336004B2

(12) United States Patent
Grolleman et al.

(10) Patent No.: US 10,336,004 B2
(45) Date of Patent: Jul. 2, 2019

(54) APPARATUS AND METHOD FOR STITCHING TOGETHER LEADING END AND TRAILING END OF A TIRE COMPONENT

(71) Applicant: VMI HOLLAND B.V., Epe (NL)

(72) Inventors: Henk-Jan Grolleman, Epe (NL); Luuk Van Tienen, Epe (NL)

(73) Assignee: VMI HOLLAND B.V. (NL)

( * ) Notice: Subject to any disclaimer, the term of this patent is extended or adjusted under 35 U.S.C. 154(b) by 3 days.

(21) Appl. No.: 15/564,178

(22) PCT Filed: Jun. 27, 2016

(86) PCT No.: PCT/NL2016/050452
§ 371 (c)(1),
(2) Date: Oct. 3, 2017

(87) PCT Pub. No.: WO2017/007303
PCT Pub. Date: Jan. 12, 2017

(65) Prior Publication Data
US 2018/0126660 A1    May 10, 2018

(30) Foreign Application Priority Data

Jul. 6, 2015    (NL) ..................... 2015094

(51) Int. Cl.
*B29C 65/00*    (2006.01)
*B29C 65/56*    (2006.01)
(Continued)

(52) U.S. Cl.
CPC .......... *B29C 66/4322* (2013.01); *B29C 65/56* (2013.01); *B29C 65/62* (2013.01);
(Continued)

(58) Field of Classification Search
CPC .................... B29C 66/855; B29C 66/4322
See application file for complete search history.

(56) References Cited

U.S. PATENT DOCUMENTS

| 3,408,244 A | 10/1968 | Frazier | 156/403 |
| 3,909,341 A | 9/1975 | Moscovita | 156/502 |

(Continued)

FOREIGN PATENT DOCUMENTS

| JP | S6431628 | 2/1989 | B29C 65/78 |
| JP | H05261841 | 10/1993 | B29C 53/42 |

(Continued)

OTHER PUBLICATIONS

Russian Decision to Grant (w/translation) issued in application No. 2017108845, dated Mar. 22, 2018 (17 pgs).

(Continued)

*Primary Examiner* — Timothy Kennedy
(74) *Attorney, Agent, or Firm* — Hayes Soloway P.C.

(57) ABSTRACT

An apparatus and a method for stitching are provided. The apparatus includes a separator for separating in a separation position the leading end and the trailing end from a working surface to form a separation space, a stitcher unit with a stitcher foot to support the leading end and the trailing end from the separation space and a stitcher head for stitching the leading end and the trailing end on the stitcher foot from outside the separation space, a stitcher drive for driving the stitcher unit, a separator drive for retracting the separator, and a control unit to control the separator drive and the stitcher drive simultaneously such that, during the stitching, the separator is retracted in the stitching direction ahead of the stitcher unit.

23 Claims, 12 Drawing Sheets

(51) Int. Cl.
*B29C 65/78* (2006.01)
*B29C 65/62* (2006.01)
*B29L 30/00* (2006.01)
*B29D 30/42* (2006.01)

(52) U.S. Cl.
CPC ...... *B29C 65/7802* (2013.01); *B29C 65/7826* (2013.01); *B29C 66/1142* (2013.01); *B29C 66/49* (2013.01); *B29C 66/71* (2013.01); *B29C 66/73752* (2013.01); *B29C 66/81433* (2013.01); *B29C 66/81469* (2013.01); *B29C 66/8242* (2013.01); *B29C 66/8362* (2013.01); *B29C 66/855* (2013.01); *B29D 2030/422* (2013.01); *B29D 2030/427* (2013.01); *B29L 2030/008* (2013.01)

(56) References Cited

U.S. PATENT DOCUMENTS

| | | | | |
|---|---|---|---|---|
| 4,765,862 | A | 8/1988 | Azuma | 156/507 |
| 5,348,600 | A | 9/1994 | Ishii | B29D 30/26 |
| 7,694,709 | B2 | 4/2010 | Kaagman et al. | 156/360 |
| 8,905,106 | B2 | 12/2014 | Ogawa | B29C 65/004 |
| 2014/0130959 | A1 | 5/2014 | Lacouture et al. | 156/110.1 |

FOREIGN PATENT DOCUMENTS

| | | | |
|---|---|---|---|
| JP | H08238686 | 9/1996 | B29D 30/30 |
| JP | 2007320196 | 12/2007 | B29D 30/30 |
| RU | 2343073 | 1/2009 | B29D 30/30 |
| RU | 2457949 | 8/2012 | B29D 30/00 |
| WO | WO2009157028 | 12/2009 | B29D 30/00 |
| WO | WO2012096275 | 7/2012 | B29C 65/78 |
| WO | WO2014204299 | 12/2014 | B29D 30/42 |

OTHER PUBLICATIONS

International Search Report and Written Opinion issued in application No. PCT/NL2016/050452, dated Nov. 10, 2016 (11 pgs).
Japanese Official Action (w/translation) issued in application No. 2017-505604, dated Jan. 11, 2018 (5 pgs).
Japanese Decision to Grant (w/translation) issued in application No. 2017-505604, dated Sep. 21, 2018 (6 pgs).

APPARATUS AND METHOD FOR STITCHING TOGETHER LEADING END AND TRAILING END OF A TIRE COMPONENT

BACKGROUND

The invention relates to an apparatus and a method for stitching a leading end of a tire component to a trailing end of the same or another tire component along a splice line.

U.S. Pat. No. 5,348,600 discloses a method and an apparatus in which a first belt-shaped member is wound around a forming drum and subsequently a second belt-shaped member is wound around the first belt-shaped member at the forming drum. The leading end and the trailing end of each belt-shaped member are joined by butt-splicing. The uncured rubber of both belt-shaped members strongly adhere to each other at contact. To prevent the second belt-shaped member from adhering to the first belt-shaped member at the butt-line prior to joining, the leading end and the trailing end thereof are received on the sides of an auxiliary bar in the form of a triangular prism. Gripping pawls are inserted between the auxiliary bar and the respective leading end and trailing end to grip the leading end and the trailing end at multiple spaced apart positions along the leading end and the trailing end. The leading end and the trailing end are subsequently lifted from the auxiliary bar and the latter is removed in an upward direction. The leading end and the trailing end may now be brought together into butting contact by the gripping pawls.

When using these gripping pawls to move the leading and trailing end to butt against each other, the leading and trailing end of the belt-shaped member undulate along the butt line. A drawback of the known method and apparatus is therefore that at some positions along the butt line the leading end and the trailing end overlap, while at other positions along said butt line the leading end and the trailing end are at a distance from each other. Although the leading and trailing ends of the belt-shaped member can be joined by a joining roller to form a cylindrical member, the resulting joint is not of a constant quality along the butt line.

It is an object of the present invention to provide an apparatus and a method for stitching a leading end of a tire component to a trailing end of the same or another tire component along a splice line, wherein the quality of the splice can be improved.

SUMMARY OF THE INVENTION

According to a first aspect, the invention provides an apparatus for stitching a leading end of a tire component to a trailing end of the same or another tire component along a splice line above a working surface, which working surface is arranged to support the respective one or two tire components, wherein the apparatus comprises a separator for in a separation position separating the leading end and the trailing end from the working surface to form a separation space, wherein the apparatus comprises a stitcher unit with a stitcher foot that is arranged to support the leading end and the trailing end at the splice line from the separation space and a stitcher head that is arranged for stitching the leading end and the trailing end on the stitcher foot from outside the separation space, wherein the stitcher unit comprises a stitcher drive for driving the stitcher unit in a stitching direction along the splice line while the stitcher unit stitches the leading end to the trailing end and a separator drive that is coupled to the separator for retracting the separator in the stitching direction parallel to the splice line, wherein the apparatus further comprises a control unit that is operationally connected to and arranged to control the separator drive and the stitcher drive simultaneously such that, during the stitching, the separator is retracted in the stitching direction ahead of the stitcher unit.

The separator can effectively separate the leading end and the trailing end from the working surface to prevent adherence of said ends to the working surface prior to the stitching. Just prior to the stitching, the leading end and the trailing end can be transferred from the retracting separator into the advancing stitcher unit. The retracting separator can be kept ahead of the advancing stitcher unit during the stitching, such that the separator does not interfere with the stitching operation of the stitcher unit.

In an embodiment the control unit is arranged to control the stitcher drive to move the stitcher unit at a stitching speed in the stitching direction, wherein the control unit is arranged for controlling the separator drive during the stitching to retract the separator in the stitching direction at a retraction speed that is equal to or greater than the stitching speed of the stitcher unit. Thus, the separator can be kept ahead of the stitcher unit in the stitching direction during the entire stitching.

In an alternative embodiment the stitcher head comprises a set of upper stitching wheels which are arranged to engage the leading end and the trailing end and to be driven at a rotation speed to pull the stitcher unit over said trailing end and said leading end along the stitching line at a stitching speed in the stitching direction. Hence, the stitching speed can be controlled by controlling the rotation speed of the upper stitching rollers.

In an embodiment thereof the stitcher drive comprises a first drive member that is arranged for holding the stitcher unit and a second drive member for holding the first drive member, wherein the stitcher drive further comprises a retraction drive for retracting the second drive member in the stitching direction at a drive speed, wherein the control unit is operationally connected to the separator drive and the retraction drive to retract the second drive member at a drive speed and to retract the separator at a retraction speed that is equal or substantially equal to the drive speed, wherein the first drive member is movable back and forth with respect to the first drive member in the stitching direction to absorb a difference in the stitching speed of the stitcher unit with respect to the second drive member as a result of variable resistance between the stitcher unit and the one or more tire components during the stitching, wherein the assembly is provided with one or more sensors for detecting such speed difference or the position of the first drive member with respect to the second drive member, wherein the control unit is arranged for compensating for the difference in the stitching speed, e.g. by controlling the drive speed of the second drive member and/or the rotation speed of the upper stitching wheels. Consequently, variations in the stitching speed can be compensated by changing the drive speed of the second drive member.

In an embodiment the control unit is arranged to control the separator drive and the stitcher drive to keep the separator at a constant or substantially constant clearance ahead of the stitcher unit in the stitching direction during the stitching. By keeping the clearance constant, it can be prevented that the tire component starts to slack or sag in the unsupported clearance between the separator and the stitcher unit.

In an embodiment the stitcher unit and the separator are arranged for not supporting the leading end and the trailing end at the clearance between the stitcher unit and the separator during the stitching. By keeping the clearance between the separator and the stitcher unit, it can be prevented that the separator interferes with the stitching operation of the stitcher unit.

In an embodiment the clearance between the stitcher unit and the separator is minimal during the stitching. Thus, slacking of sagging of the tire component between the separator and the stitcher unit can be prevented as much as possible. This is particularly achieved when the clearance between the stitcher unit and the separator during the stitching is less than ten centimeters, preferably less than five centimeters and most preferably less than two centimeters.

In an embodiment the separator is arranged for separating the leading end and the trailing end from the working surface over a separation distance in a normal direction perpendicular to the working surface, wherein the stitcher foot has a height in the same normal direction, wherein the separation distance is equal to or larger than the height of the stitcher foot. The stitcher foot can thus be inserted into the separation space between the working surface and the splice line to support the leading end and the trailing end from within the separation space, without touching and/or damaging the working surface.

In a preferred embodiment of the invention the separator is rigid or substantially rigid. The separator can thus accurately, securely and/or rigidly support the leading end and the trailing end at or near the splice line.

In an embodiment thereof the separator is a bar or a strip. A bar or a strip can be effectively used to cover the working surface at the splice line.

In a preferred embodiment the separator drive is coupled to separator to retract the separator in the stitching direction in a translational movement. By translating the separator in the stitching direction, the separator can be retracted parallel to the splice line. The separator can thus support the leading end and the trailing end closely ahead of the stitcher unit. The rigid separator can furthermore be easily moved into and out of the separation position by simply pulling or pushing on the separator.

In an alternative embodiment the separator is flexible. A flexible separator can more closely follow the working surface.

In particular, the separator is a flexible band that is arranged to be doubled back along the splice line. By doubling back the flexible band, it can be retracted by pulling it in by one of its ends. More in particular, the separator drive is coupled to one end of the flexible band to retract the flexible band in the stitching direction by pulling in said one end of the flexible band.

According to a second aspect, the invention provides an assembly of a tire building drum and an apparatus according to any one of the preceding claims, wherein the working surface is the circumferential surface of the tire building drum or the outer surface of a further tire component supported on said circumferential surface of the tire building drum. The separator can thus be used to create a separation distance between a working surface and the leading end and the trailing end that are to be stitched, so that said leading end and said trailing end may subsequently be engaged by the stitcher unit. Thus, the separator enables the stitching of the leading end and the trailing end above a cylindrical working surface.

In an embodiment thereof the tire building drum has a rotation axis, wherein the circumferential surface of the tire building drum extends concentrically around the rotation axis and wherein the splice line extends parallel or substantially parallel to the rotation axis. The separator can thus be retracted along the splice line and/or parallel to the rotation axis of the tire building drum.

According to a third aspect, the invention provides a method for stitching a leading end of a tire component to a trailing end of the same or another tire component along a splice line above a working surface, which working surface is arranged to support the respective one or two tire components, wherein the method comprises the steps of;

providing a separator;

separating the leading end and the trailing end with a separator in a separation position from the working surface to form a separation space;

providing a stitcher unit with a stitcher foot and a stitcher head;

supporting the leading end and the trailing end with the stitcher foot at the splice line from the separation space and stitching the leading end and the trailing end on the stitcher foot with the stitcher head from outside the separation space, driving the stitcher unit in a stitching direction along the splice line while the stitcher unit stitches the leading end to the trailing end; and retracting the separator ahead of the stitcher unit in the stitching direction.

Again, the separator can effectively separate the leading end and the trailing end from the working surface to prevent adherence of said ends to the working surface prior to the stitching. Just prior to the stitching, the leading end and the trailing end can be transferred from the retracting separator into the advancing stitcher unit. The retracting separator can be kept ahead of the advancing stitcher unit during the stitching, such that the separator does not interfere with the stitching operation of the stitcher unit.

In a preferred embodiment of the method the separator is retracted in the stitching direction at a retraction speed and wherein the stitcher unit is moved in the stitching direction at a stitching speed, wherein the separator is retracted with a retraction speed that is at least equal to and preferably greater than the stitching speed. Thus, the separator can be kept ahead of the stitcher unit in the stitching direction during the entire stitching.

In an alternative embodiment of the method the stitcher head comprises a set of upper stitching wheels which engage the leading end and the trailing end and are driven at a rotation speed to pull the stitcher unit over said trailing end and said leading end along the stitching line at a stitching speed in the stitching direction. Hence, the stitching speed can be controlled by controlling the rotation speed of the upper stitching rollers.

In an embodiment thereof the stitcher drive comprises a first drive member that holds the stitcher unit and a second drive member that holds the first drive member, wherein the second drive member is retracted in the stitching direction at a drive speed and the separator is retracted in the stitching direction at a retraction speed that is equal or substantially equal to the drive speed, wherein the first drive member is moved back and forth with respect to the first drive member in the stitching direction to absorb a difference in the stitching speed of the stitcher unit with respect to the second drive member as a result of variable resistance between the stitcher unit and the one or more tire components during the stitching, wherein such speed difference or the position of the first drive member with respect to the second drive member is detected and the drive speed of the second drive member is controlled to compensate for the difference in the stitching speed. Consequently, variations in the stitching speed can be compensated.

In a further embodiment of the method the separator is kept at a constant or substantially constant clearance ahead of the stitcher unit in the stitching direction during the stitching. By keeping the clearance constant, it can be prevented that the tire component starts to slack or sag in the unsupported clearance between the separator and the stitcher unit.

In a preferred embodiment of the method, the leading end and the trailing end are unsupported at the clearance between the stitcher unit and the separator during the stitching. By keeping the clearance between the separator and the stitcher unit, it can be prevented that the separator interferes with the stitching operation of the stitcher unit.

In particular, the clearance between the stitcher unit and the separator is minimal during the stitching. Thus, slacking of sagging of the tire component between the separator and the stitcher unit can be prevented as much as possible. This is particularly achieved when the clearance between the stitcher unit and the separator during the stitching is less than ten centimeters, preferably less than five centimeters and most preferably less than two centimeters.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
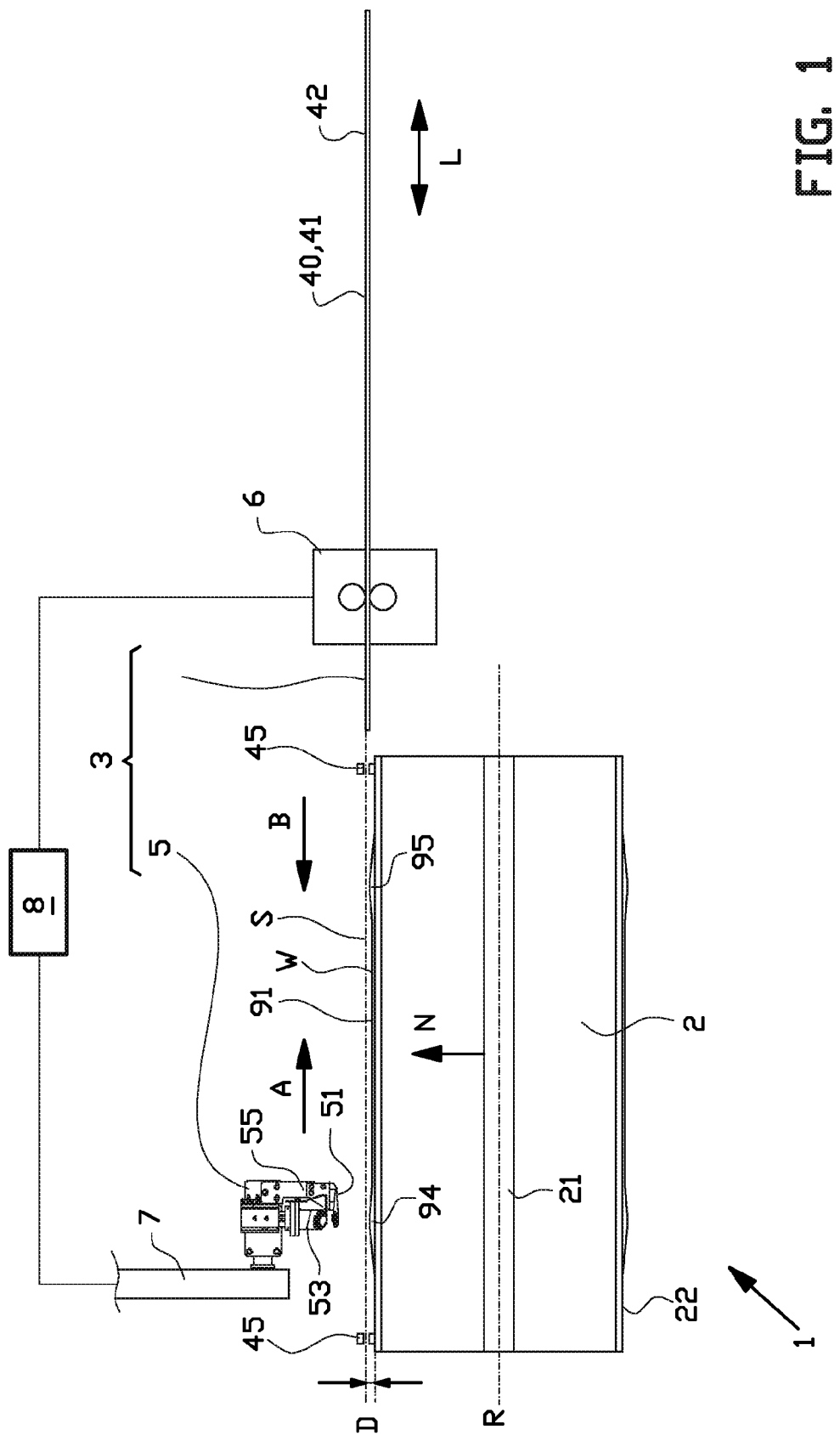
FIG. 1 shows an assembly of a tire building drum and an apparatus according to a first embodiment of the invention, during a first step of a method for stitching a leading end to a trailing end.

FIGS. 1-8 show an assembly 1 according to a first exemplary embodiment of the invention, comprising a tire building drum 2 for receiving one or more tire components and an apparatus 3 with a separator 4 for separating one or more of the tire components from a working surface W and a stitcher unit 5 for joining, splicing or stitching said one or more tire components along a butt line or splice line S.

Figure 7:
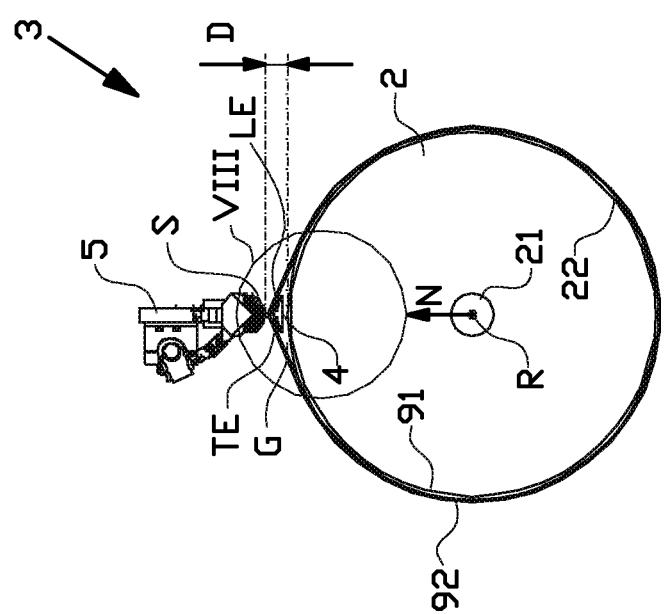
FIG. 7 shows a side view of the assembly according to FIG. 6.

As shown in FIG. 7, the tire building drum 2 comprises a central shaft 21 that defines a rotation axis R about which the tire building drum 2 is rotatable. The tire building drum 2 further comprises a circumferential surface extending circumferentially and/or concentrically about the rotation axis R. The circumferential surface 22 is arranged for receiving one or more tire components, for example an inner liner 91 and a body ply 92. In this example, the inner liner 91 has been provided with sidewalls 94, 95 to form a so-called pre-assembly. As shown in FIG. 7, each of the tire components is wound around the circumferential surface 22 in a manner known per se and has a leading end LE and a trailing end TE which are butt-joined, butt-spliced, spliced or stitched together along the splice line S. In this example, the splice line S of the body ply 92 extends parallel to or substantially parallel to the rotation axis R. The inner liner 91 is typically applied directly on the circumferential surface 91, while the body ply 92 is applied around the inner liner 91. The body ply 92 is thus radially outside the inner liner 91 with respect to the rotation axis R. Optionally, a further body ply (not shown) may be applied around the body ply 92. The body ply comprises uncured rubber that adheres strongly to the other tire components upon contact.

As shown in detail in FIG. 8, the separator 4 is arranged for separating the leading end LE of one of the tire components and the trailing end TE of the same or another one of the tire components from the working surface W directly below or radially inside said leading end LE and said trailing end TE. In this example the leading end LE and the trailing end TE are both of the same body ply 92. As the body ply 92 is arranged around the inner liner 91 and/or the pre-assembly, the working surface W directly below or radially inside the second body ply 93 is the radially outer surface of the inner liner 91 and/or the pre-assembly. Alternatively or additionally, the separator 4 may be used to separate the leading end LE and the trailing end TE of a further body ply (not shown) from the body ply 92, in which case the radially outer surface of the body ply 92 is the working surface W. In a further alternative embodiment, the working surface W may even be the circumferential surface 22 of the tire building drum 2, for example in a case where the body ply 92 is applied directly onto the tire building drum 2. The following description is however based on the exemplary situation in which the leading end LE and the trialing end TE of the body ply 92 are separated from the working surface W formed by the inner liner 91.

Figure 2:
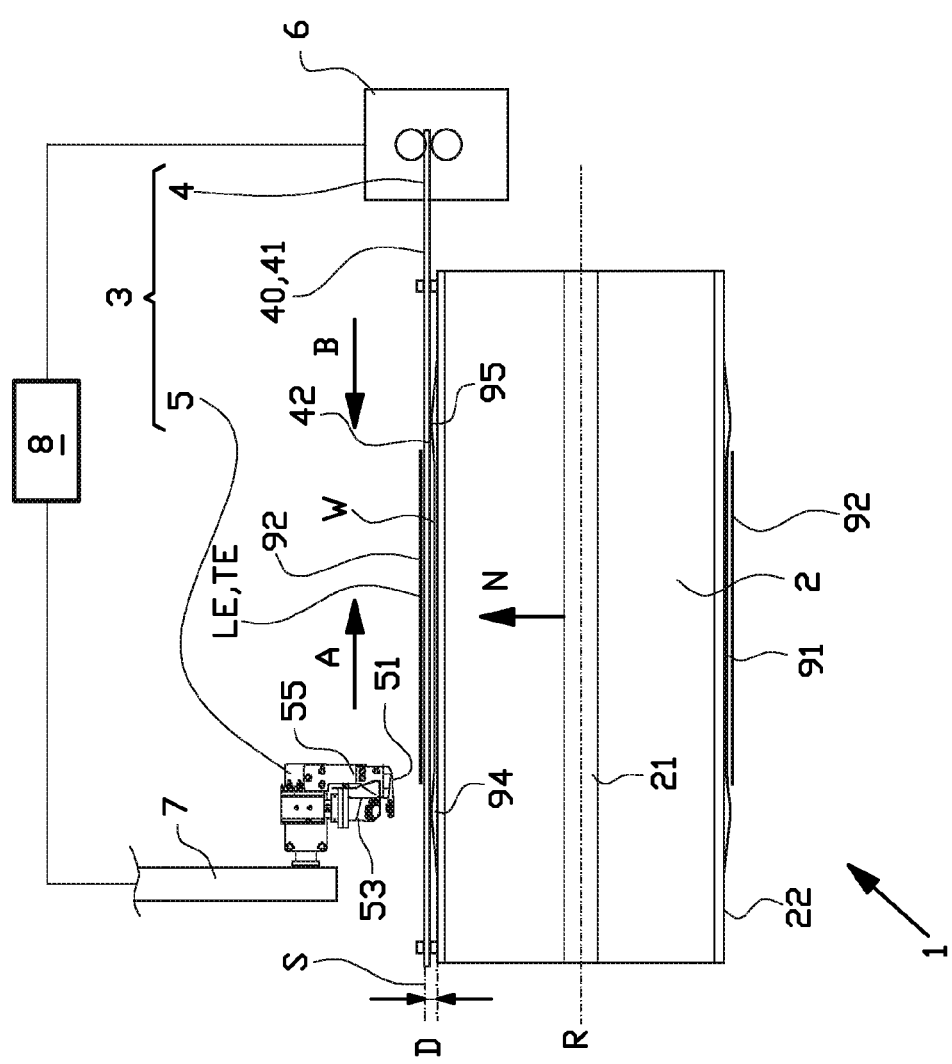
FIGS. 2-5 show the assembly of FIG. 1 during the subsequent steps of the method for stitching the leading end to the trailing end.
Figure 5:
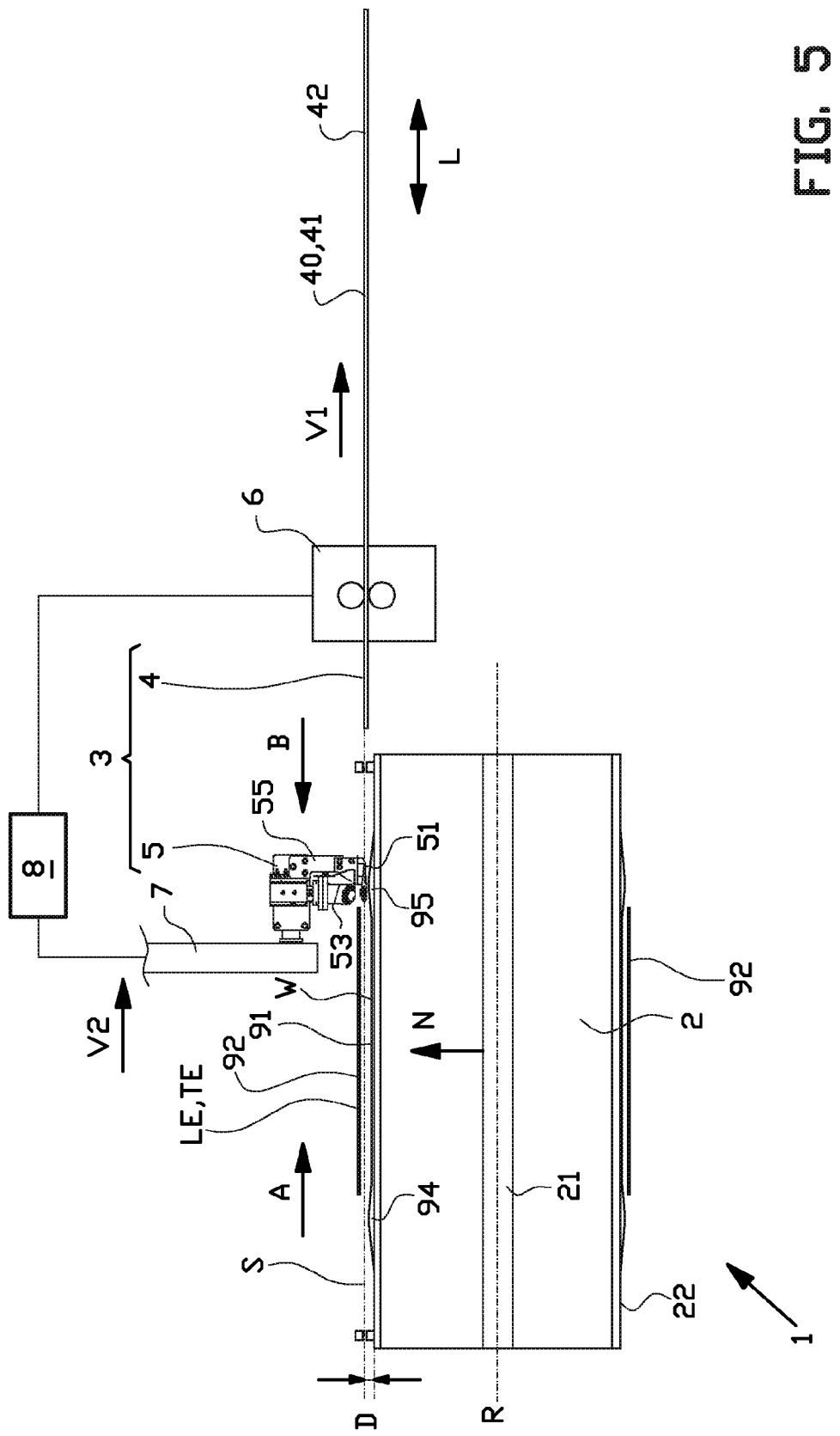

The separator 4 is movable onto the working surface W into a separation position as shown in FIG. 2. The separator 4 is retractable from the working surface W in a stitching direction A parallel to the splice line S from the separation position as shown in FIG. 2 to a retracted position as shown in FIG. 5. Preferably, the separator 4 is moved onto the working surface W in a placement direction B opposite to the stitching direction A and parallel to the splice line S. In this exemplary embodiment, the apparatus 3 comprises a separator drive 6 that is coupled to the separator 4 for retracting the separator 4 at a retraction speed V1 in the stitching direction A parallel to the splice line S. The separator drive 6 is preferably also arranged for moving the separator 4 onto the working surface W in the placement direction B. The separator drive 6 drives the separator 4 linearly or in translation in the stitching direction A and/or the placement direction B.

As shown in FIGS. 1 and 2, the assembly 1 comprises a plurality of guides 45 for guiding and/or supporting the separator 4 above the working surface W and along the splice line S. The guides 45 are preferably positioned at or near the separation position and the retraction position to prevent sagging of the separator 4 with respect to the splice line S.

As shown in FIG. 1, the separator 4 comprises a rigid bar or strip 40 with an elongated body 41 extending in a longitudinal direction L parallel to the splice line S. As best seen in FIG. 8, the elongated body 41 covers the working surface W in a splice area C extending directly below and on both sides of the splice line S. The elongated body 41 is provided with a support surface 42 that faces away from the working surface W. In this example, the elongated body 41 has a substantially triangular cross section with the support surface 42 being formed by two sides of the triangular cross section. Each side of the support surface 42 is arranged for receiving and/or supporting one of the leading end LE and the trailing end TE, respectively.

Figure 8:
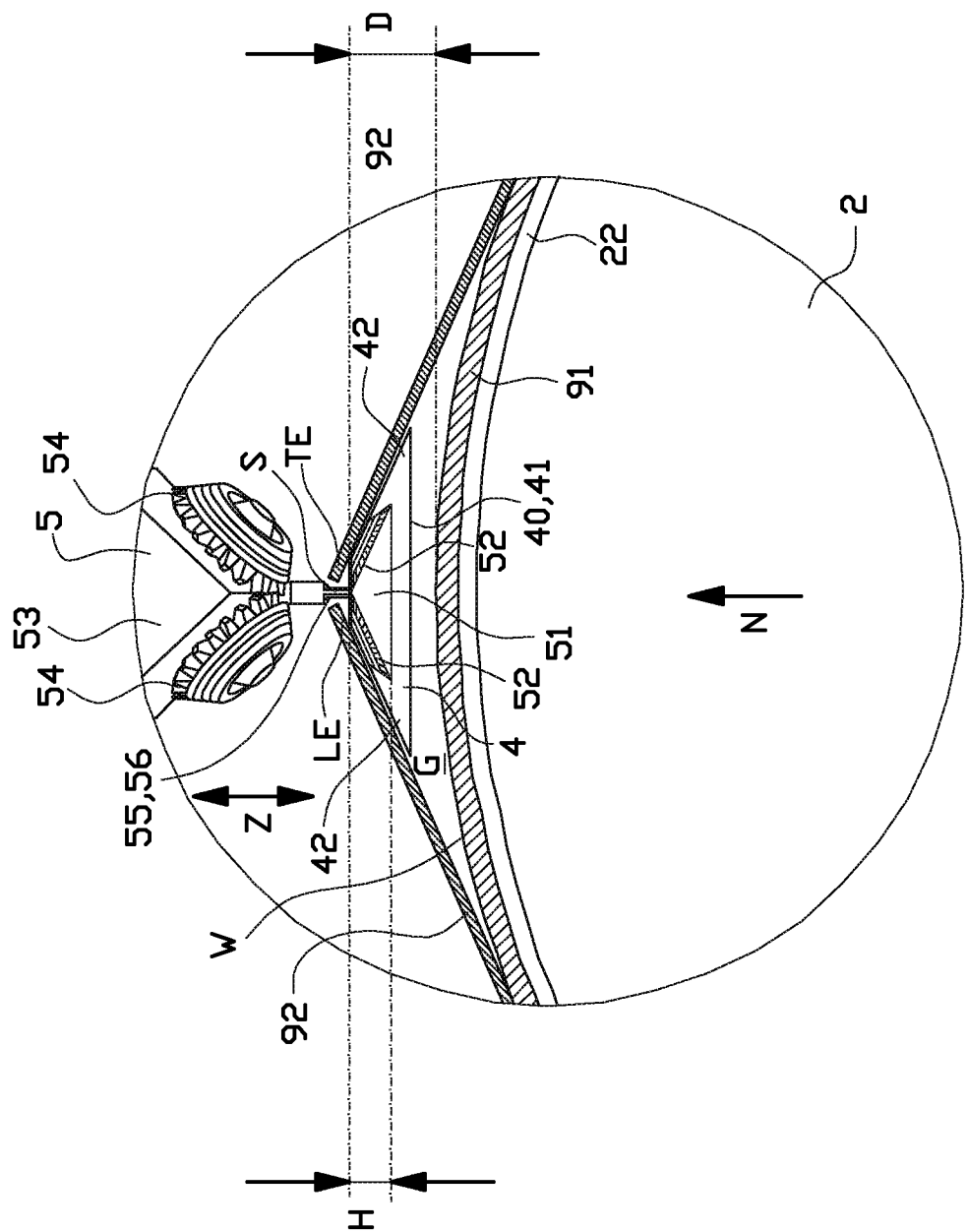
FIG. 8 shows a detail of the assembly according to the circle in FIG. 7.

As shown in FIG. 8, the leading end LE and the trailing end TE of the second body ply 93 are supported by the separator 4 at a distance from or spaced apart from the working surface W in the radial direction of the tire building drum 2 towards the splice line S. In particular, the separator 4 extends at a separation distance D above and in a direction N normal to the working surface W, wherein the leading end LE and the trailing end TE are spaced apart from the working surface W over at least said separation distance D. The separation of the leading end LE and the trailing end TE by the separator 4 over the separation distance D creates or forms a separation space G between the working surface W and both the leading end LE and the trailing end TE. As a result the leading end LE and the trailing end TE, including an area of the body ply 92 to the sides of said leading end LE and trailing end TE, are separated from the working surface W. By separating the leading end LE and the trailing end TE from the working surface W prior to the stitching, the leading end LE and the trailing end TE can be manipulated by the stitcher unit 5 without the separated leading end LE and the separated trailing end TE adhering to the working surface W.

As shown in FIG. 8, the leading end LE and the trailing end TE are received on the separator 4 while being slightly spaced apart from the splice line S on opposite sides of said splice line S. Thus, the leading end LE and the trailing end TE leave a gap at the splice line S prior to the stitching.

Figure 3:
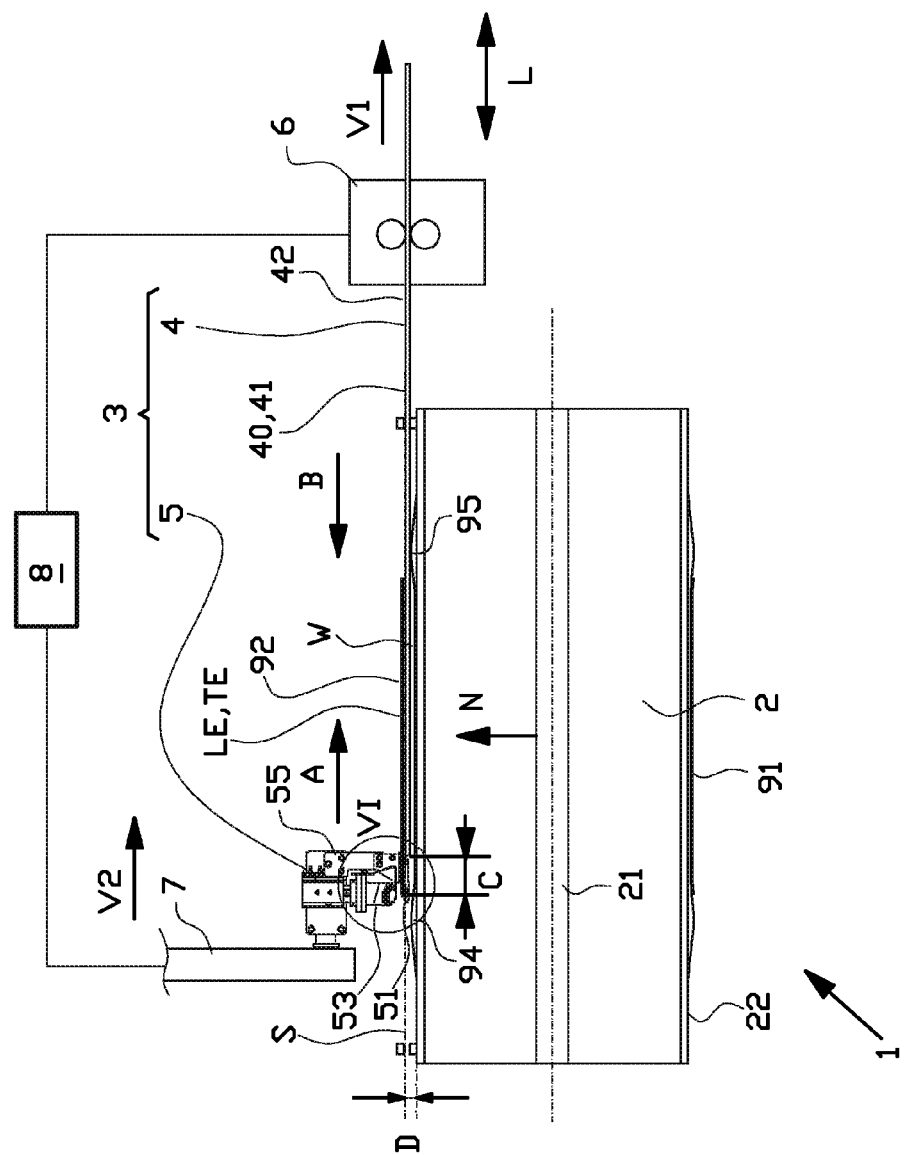
Figure 6:
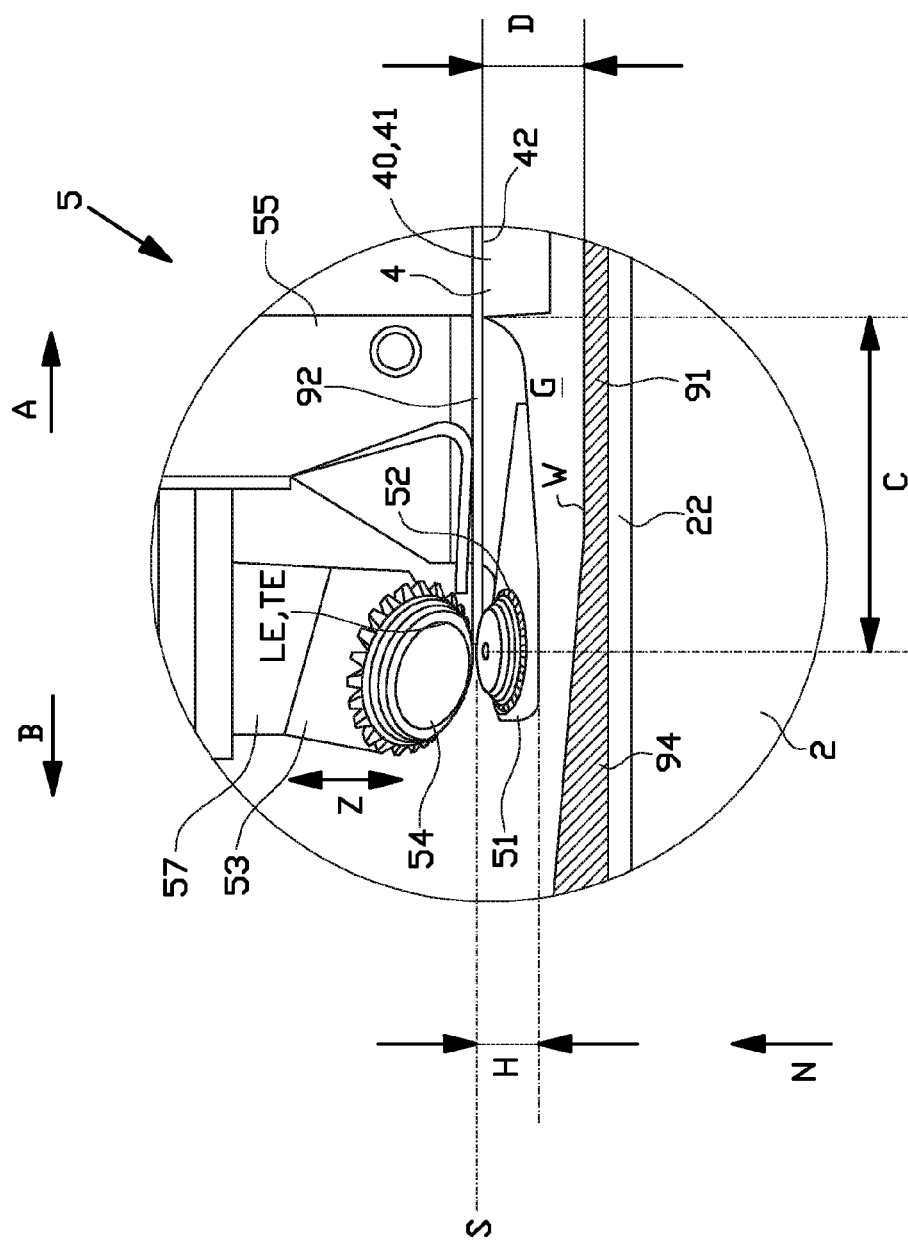
FIG. 6 shows a detail of the assembly according to the circle V in FIG. 3.

As shown in FIG. 3, the stitcher unit 5 is movable into a support position in which it supports and/or engages the leading end LE and the trialing end TE from within the separation space G that is created by the separator 4. As best seen in FIG. 6, the stitcher unit 5 comprises a stitcher foot 51 that is arranged to be inserted underneath or at the radial inside of the body ply 92 at or near the splice line S. In the support position, the stitching foot 51 is opposite to, at the same radial height as and/or aligned with the separator 4 in the stitching direction A. The stitcher foot 51 supports the leading end LE and the trailing end TE at the splice line S from within the separation space G. The stitcher foot 51 is thus arranged for supporting the leading end LE and the trailing end TE from below or at the radial inside of the body ply 92. In this example, the stitcher foot 51 comprises a set of lower stitcher wheels 52, preferably in the form of beveled or frustoconical gears, for not only supporting the leading end LE and the trailing end TE, but also for forcing said leading end LE and said trailing end TE together towards the splice line S. Alternatively, the stitcher foot 51 may be formed by a rigid platform that solely supports the leading end LE and the trailing end TE.

As shown in FIG. 6, the stitcher foot 51 has a height H in the normal direction N that is equal to or in this example smaller than the separation distance D. Thus, the stitcher foot 51 can be easily inserted in the stitching direction A into the separation space G between the working surface W and the splice line S, without touching and/or damaging the working surface W.

As shown in FIGS. 6 and 8, the stitcher unit 5 further comprises a stitcher head 53 that is arranged for stitching the leading end LE and the trailing end TE, while the leading end LE and the trailing end TE are supported on the stitcher foot 51 at the splice line S. In particular, the stitcher head 53 presses the leading end LE against the trailing end TE at the splice line S from above or from the radial outside of the body ply 92. In this example, the stitcher head 53 comprises a set of upper stitcher wheels 54, preferably in the form of beveled or frustoconical gears.

As shown in FIG. 1, the stitcher unit 5 comprises a coupling member 55 that couples the stitcher foot 51 to the stitcher head 53. As best seen in FIG. 8, the coupling member 55 is provided with a narrow portion or a neck portion 56 that fits through the gap between the leading end LE and the trailing end TE to connect the stitcher foot 51 radially inside or below the splice line S to the stitcher head 53 radially outside or above the splice line S. The coupling member 55 extends through the gap between the leading end LE and the trailing end TE at the side of the stitcher unit 5 that is ahead of the stitching in the stitching direction A so that the coupling member 55 is ahead of the closing gap during the stitching. Preferably, as shown in FIG. 6, the stitcher unit 5 is provided with an adjustment device 57 for adjusting the distance in an adjustment direction Z between the stitcher foot 51 and the stitcher head 53, and in particular the distance between the lower stitcher wheels 52 and the upper stitcher wheels 54. Thus, body plies 92 of different thickness can be received and stitched between the stitcher foot 51 and the stitcher head 53. The adjustment device 57 can be a pneumatic cylinder or a linear drive (not shown) that moves the stitcher head 53 with respect to the coupling member 55 and/or the stitcher foot 51 in the adjustment direction Z.

The stitcher unit 5 is provided with a stitcher drive 7 that is operationally coupled to the upper stitcher wheels 54 to drive said upper stitcher wheels 54. The driven upper stitcher wheels 54 engage the body ply 92 and drive the stitcher unit 5 over said body ply 92 at a stitching speed V2 in the stitching direction A along the splice line S while simultaneously stitching the leading end LE to the trailing end TE. The stitcher drive 7 drives the stitcher unit 5 linearly or in translation in the stitching direction A. Alternatively, the upper stitcher wheels 54 may be passive or free-running wheels, in which case the stitcher drive 7 displaces the stitcher unit 5 in its entirety.

As schematically shown in FIGS. 1-5, both the separator drive 6 and the stitcher drive 7 are operationally and/or electronically coupled to a common control unit 8. The control unit 8 is arranged for sending control signals to the separator drive 6 and the stitcher drive 7 to control both drives 6, 7 simultaneously. In particular, the control unit 8 is arranged to control the separator drive 6 and the stitcher drive 7 such that, during the stitching, the separator 4 is retracted in the stitching direction A in front, downstream or ahead of the advancing stitcher unit 5. The separator 4 is retracted with at a retraction speed V1 that is at least equal to and preferably greater than the stitching speed V2 of the stitcher unit 5 in the stitching direction A. During the stitching, the separator 4 is kept ahead of the stitcher unit 5 constantly at a non-zero clearance distance or clearance C, so that the separator 4 does not interfere with the operation of the stitcher unit 5. However, the body ply 92 is unsupported between the retracting separator 4 and the advancing stitcher unit 5. Thus, to prevent sagging or slacking of the body ply 92 in the unsupported clearance C, the clearance C is preferably kept minimal or to a minimum. Most preferably, the clearance C is less than ten centimeters, preferably less than five centimeters and most preferably less than two centimeters.

The method for stitching the leading end LE to the trailing end TE with the use of the aforementioned assembly 1 will now be elucidated with reference to FIGS. 1-5.

FIG. 1 shows the situation prior to the stitching. The stitcher unit 5 is held ready in a stand by position above the working surface W. The separator 4 is fully retracted in the retracted position and is aligned with its corresponding guides 45 for subsequent placement in the placement direction B. The drum 2 is rotated into a position in which the splice position of the body ply 92 is aligned with the separator 4 and/or the splice line S. The inner liner 91, optionally provided with sidewalls 94, 95 to form a pre-assembly, is wound around the circumferential surface 22 of the drum 2 and forms the working surface W for the body ply 92.

FIG. 2 shows the situation after the control unit 8 has controlled the separator drive 6 to move the separator 4 into the separation position. During the movement from the retracted position, as shown in FIG. 1, to the separation position, as shown in FIG. 2, the separator 4 is guided by the respective guides 45. In the separation position, the separator 4 extends across or over the working surface W at or along the splice line S. After movement of the separator 4 into the separation position, the body ply 92 is wound around the circumferential surface 22 of the drum 2. First, the leading end LE is received onto the separator 4. Subsequently, the body ply 92 is wound directly onto the working surface W of the inner liner 91 until the trailing end TE which, like the leading end TE, is received onto the separator 4. The separator 4 now supports and separates both the leading end LE and the trailing end TE from the working surface W over the separation distance D towards or at the splice line S. The leading end LE and the trailing end TE are now ready for the stitching.

FIG. 3 shows the situation in which the control unit 8 has controlled the separator drive 6 to partially retract the separator 4 into the stitching direction A to expose the leading end LE and the trailing end TE for engagement by the stitcher unit 5. Subsequently or simultaneously, the control unit 8 has controlled the stitcher drive 7 to move the stitcher unit 5 into the support position in which the stitcher foot 51 extends in the stitching direction A into the separation space G underneath the exposed leading end LE and the trailing end TE. With the stitcher foot 51 supporting the exposed leading end LE and trailing end TE from within the separation space G, the stitcher head 53 can be moved from the outside of the separation space G, radially opposite to the stitcher foot 51, towards the stitcher foot 51 to clamp and/or press the leading end LE and the trailing end TE in between. Once the leading end LE and the trailing end TE are engaged by the stitcher unit 5, the stitcher unit 5 can be moved further in the stitching direction A to stitch the leading end LE to the trailing end TE.

Figure 4:
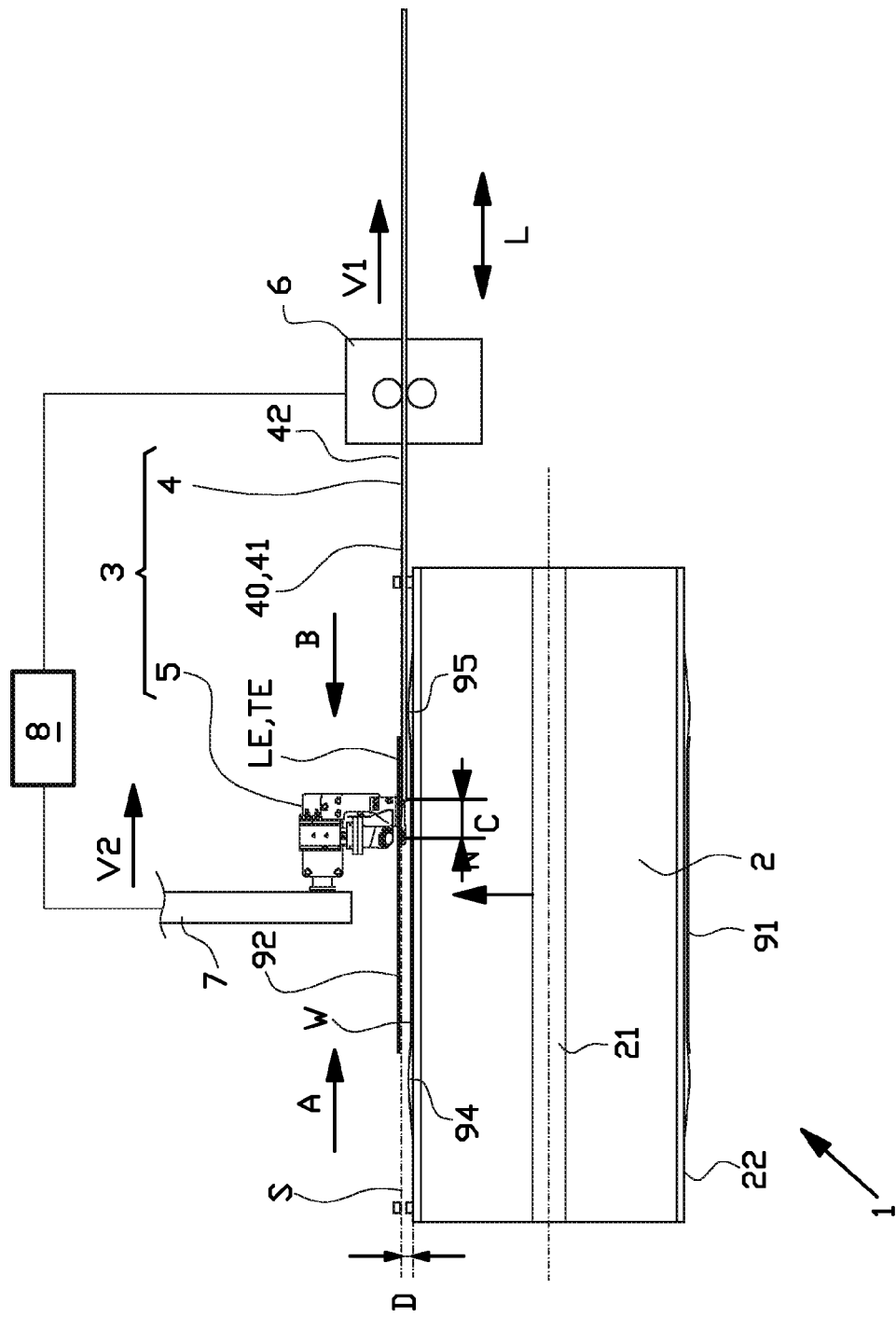

FIG. 4 shows the situation in which the control unit 8 has controlled both the separator drive 6 and the stitcher drive 7 simultaneously to move the separator 4 at a retraction speed V1 and to move the stitcher unit 5 at a stitching speed V2 in the stitching direction A along the splice line S. As described before, the control unit 8 controls both drives 6, 7 such that the separator 4 stays ahead of the stitcher unit 5 during the stitching by at least the non-zero clearance C, so that the separator 4 does not interfere with the operation of the stitcher unit 5. The leading end LE and the trailing end TE are transferred, released or fed from the separator 4 into the stitcher unit 5 just prior to the stitcher unit 5 stitching the leading end LE to the trailing end TE. Preferably, the clearance C between the separator 4 and the stitcher unit 5 in which the leading end LE and the trailing end TE are temporarily unsupported is kept as small as possible. Most preferably, the clearance C is kept constant at least during the stitching of the stitcher unit 5 along the splice line S.

FIG. 5 shows the situation after the stitcher unit 5 has finished the stitching of the leading end LE to the trailing end TE. Once the leading end LE and the trailing end TE are fully stitched, the separator 4 is retracted further into the retracted position, as shown in FIG. 5, and the stitcher unit 5 may be returned to its stand by position, as shown in FIG. 1, for a next cycle of the stitching. The stitched body ply 92 may be allowed to adhere to the working surface W, in this example the inner liner 91.

Figure 9:
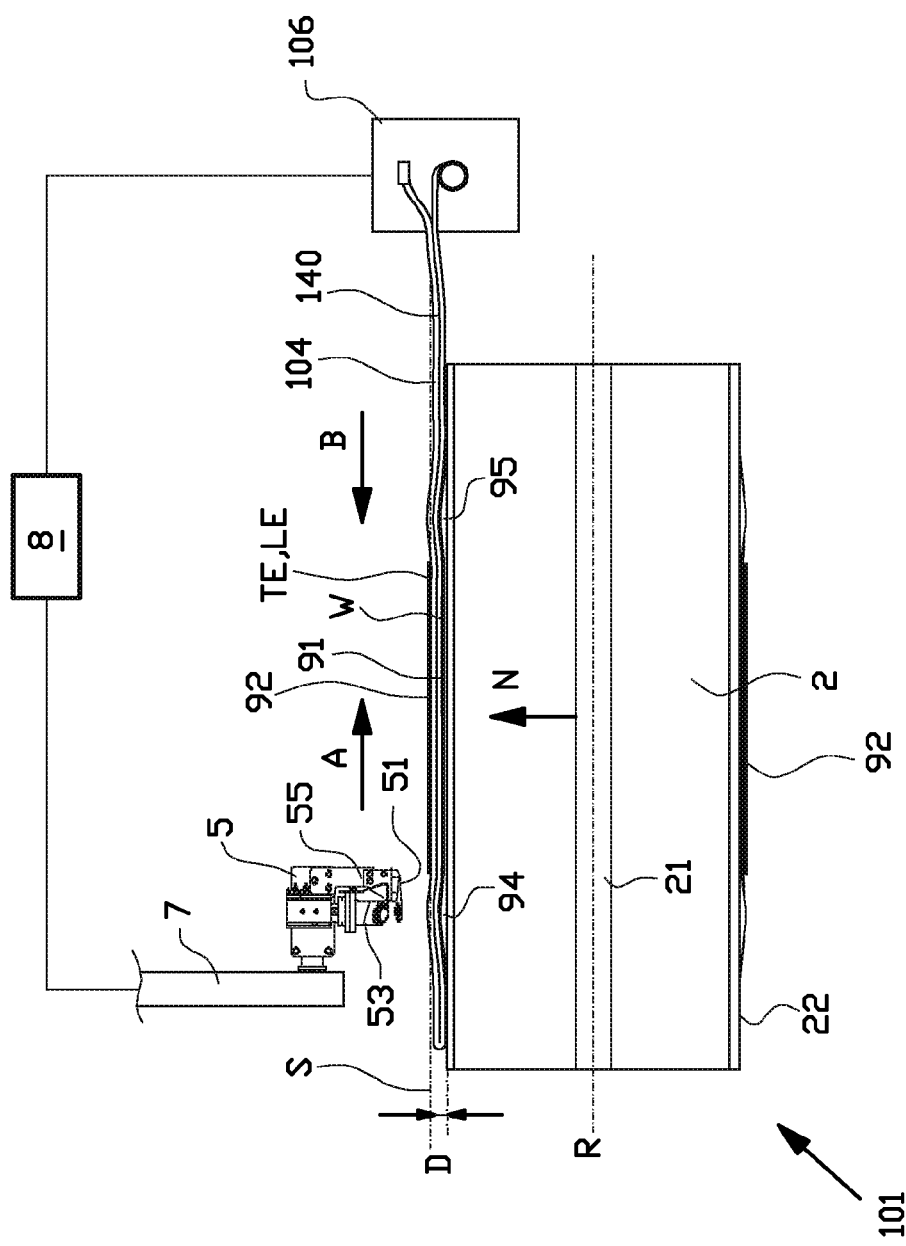
FIGS. 9 and 10 show an alternative assembly of a tire building drum and an alternative apparatus according to a second embodiment of the invention.
Figure 10:
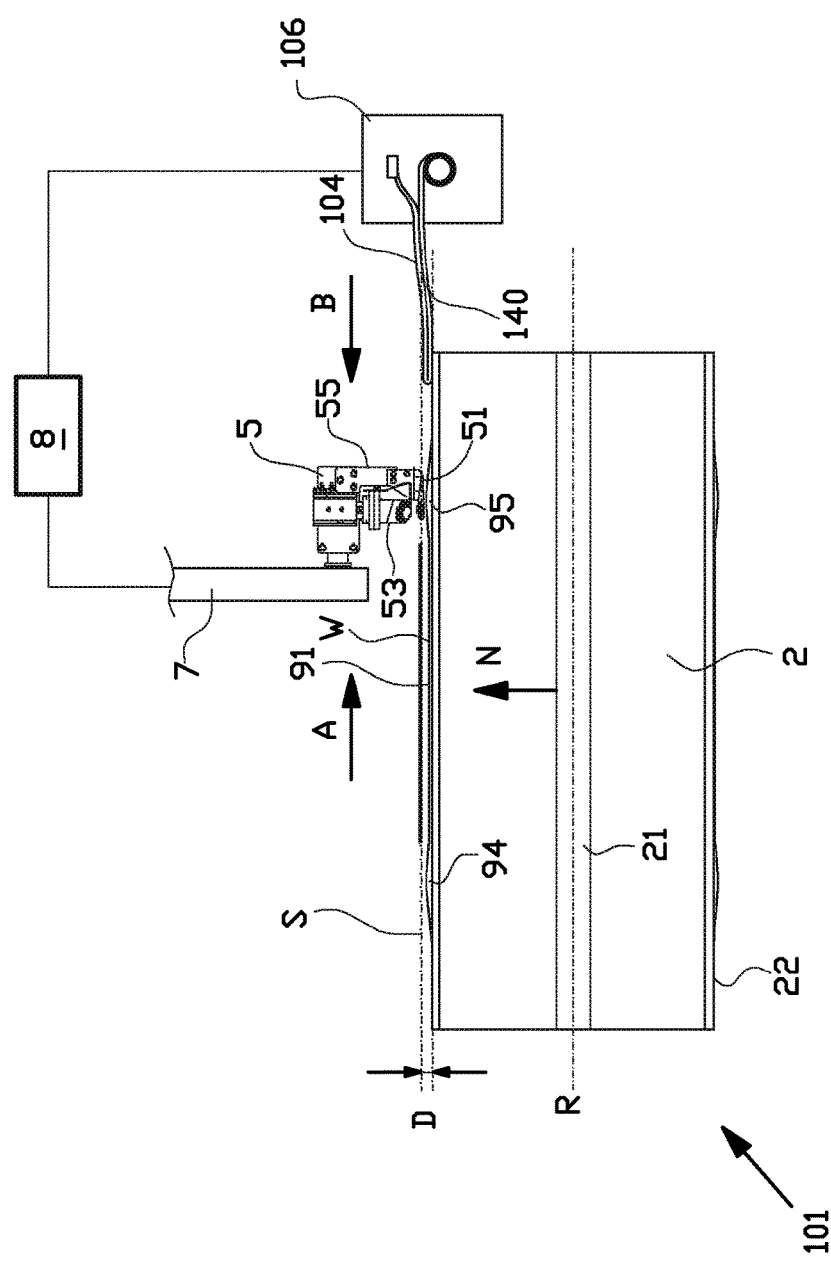

FIGS. 9 and 10 show an alternative assembly 101 according to a second embodiment of the invention, which differs from the aforementioned first embodiment of the invention only in that its separator 104 does not have a rigid body but instead comprises a flexible band 140. The flexible band 140 is arranged to be folded back onto itself or to be doubled back along the splice line S. The radially inner side of the doubled back flexible band 140 rests on the working surface W while the radially outer side of the doubled back flexible band 140 supports the leading end LE and the trailing end TE at the separation distance D above the working surface W. The separation distance D is determined by the doubled back thickness of the flexible band 140, which in this case is in the order of a few centimeters.

The alternative assembly 101 is provided with an alternative separator drive 106 for pulling in one of the two ends of the doubled back flexible band 140. The other one of the two ends is fixed. Thus, when the doubled back flexible band 140 is pulled in by one of its two ends, the doubled back length of the flexible band 140 is reduced, causing the flexible band 140 to be retracted in the stitching direction A. Again, the retraction speed V1 of the flexible band 140 is controlled by the control unit 8 in the same way as described in relation to the previous embodiment of the invention, so that the flexible band 140 remains ahead of the stitcher unit 5 in the stitching direction A during the stitching.

FIG. 9 shows the alternative assembly 101 prior to the stitching. The flexible band 140 of the separator 104 has been paid out to such an extent that it can be manually placed onto the working surface W in the doubled back configuration as shown in FIG. 9. The flexible band 140 now fully covers the working surface W, in this example the inner liner 91. The body ply 92 is wound onto the working surface W, while the leading end LE and the trailing end TE thereof are received on the separator 104 near the splice line S. The leading end LE and the trailing end TE are now ready to be stitched.

FIG. 10 shows the situation after the stitching. The stitcher drive 7 has been controlled by the control unit 8 to move the stitcher unit 5 in the stitching direction A, while the alternative separator drive 106 has pulled in one of the two ends of the flexible band 140 so that the separator 104 has been retracted ahead of the stitcher unit 5 during the stitching. As shown in FIG. 10, the flexible band 140 of the separator 104 is retracted to a retracted position beyond the body ply 92 in the stitching direction A.

An advantage of the flexible band 140 is that it does not consume a lot of space when retracted into the retracted position. It can be substantially retracted against or even pulled into the separator drive 106. Hence, the separator drive 106 may alternatively be attached directly to the side of the tire building drum 2 and remain attached during rotation of said tire building drum 2. The separator drive 106 can therefore always be at the correct position aligned with the splice line S.

Figure 11A:
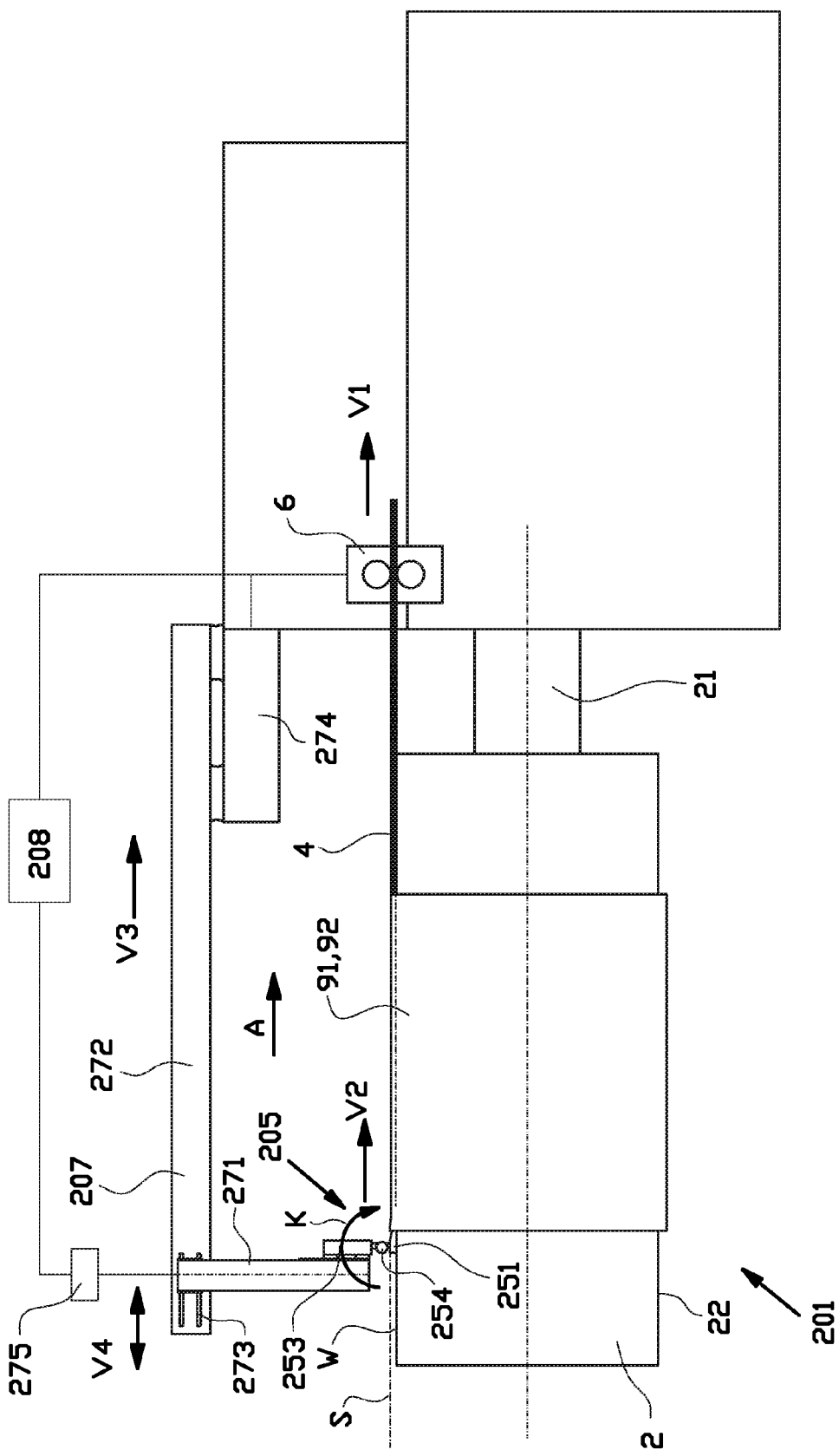
FIGS. 11A and 11B show a further alternative assembly of a tire building drum and an alternative apparatus according to a third embodiment of the invention.
Figure 11B:
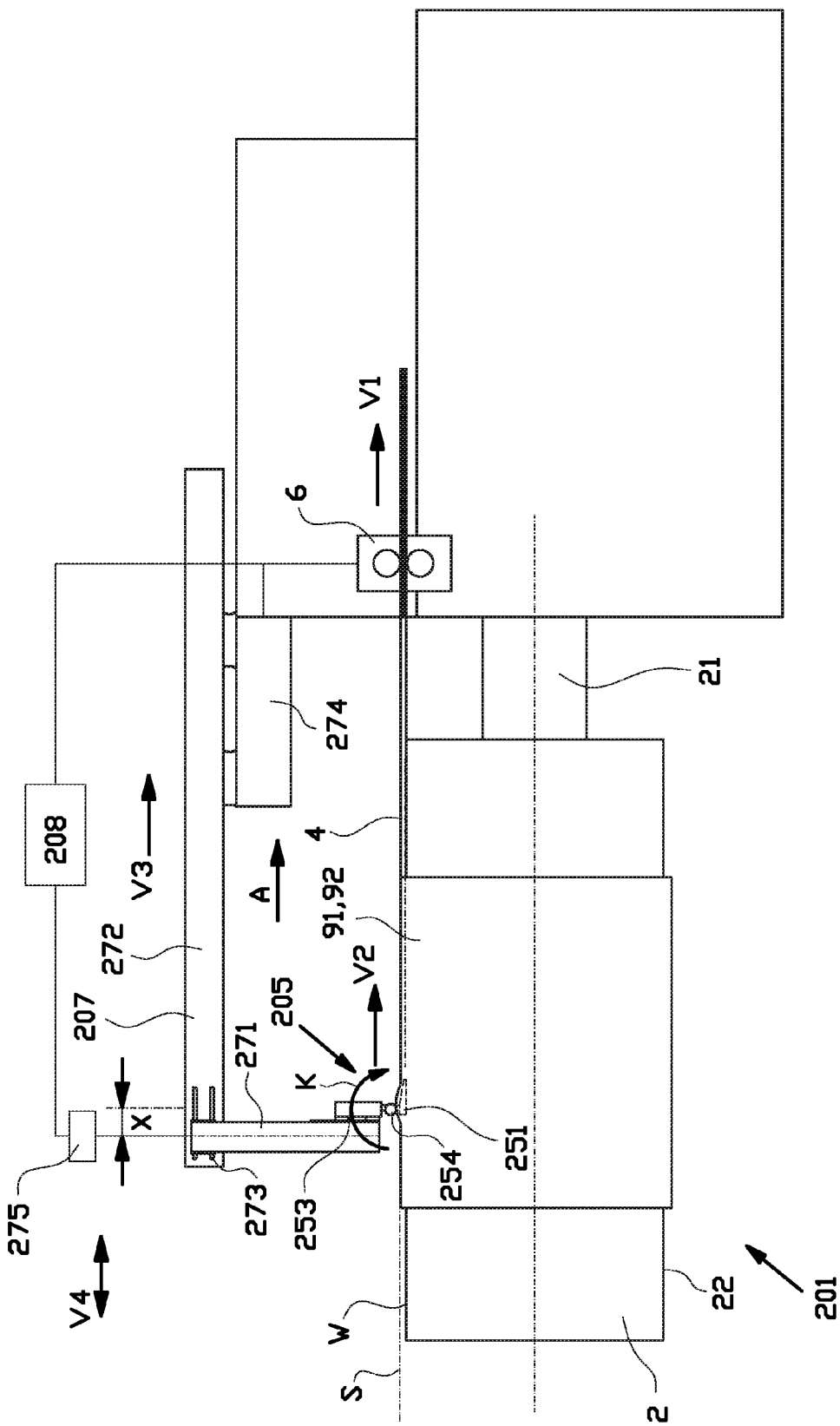

FIGS. 11A and 11B show an alternative assembly 201 according to a third embodiment of the invention, which differs from the aforementioned first embodiment and second embodiment of the invention in that its stitcher unit 205 is driven by an alternative stitcher drive 207 that comprises a first drive member 271 for holding the stitcher unit 205 and a second drive member 272 for holding the first drive member 271. The second drive member 272 is preferably formed as an elongate arm extending in the stitching direction A overhead the working surface W. The first drive member 271 is mounted to the second drive member 272 via a sliding elements 273, in particular a rail, and is slidable or movable back and forth with respect to the second drive member 272 in the stitching direction A within a range defined by said sliding element 273. The alternative assembly 201 is provided with a retraction drive 274 for retracting the second drive member 272 at a drive speed V3 in the stitching direction A. The control unit 208 is electronically connected to both the retraction drive 274 and the separator drive 6 and is arranged for matching the drive speed V3 to the retraction speed V1 of the separator drive 6. Hence, the second drive member 272 is retracted at the drive speed V3 that is equal or substantially equal to the retraction speed V1 of the separator 4.

Like the previously discussed stitcher units 5, the stitcher unit 205 according to this third embodiment of the invention comprises a stitcher foot 251, a stitcher head 253 and a set of upper stitcher wheels 254 that are driven at a rotation speed K by a wheel drive (not shown) inside the stitching head 253. Once the upper stitcher wheels 254 engage the material 91, 92 on the working surface W, the rotation of said wheels 254 pulls the stitcher unit 205 along the stitcher line S over said material 91, 92 at a stitching speed V2. The rotation speed K of the stitcher wheels 254 is such that the stitcher unit 205 is initially pulled over the material 91, 92 in the stitching direction A at a stitching speed V2 that is equal or substantially equal to the retraction speed V1. However, during the stitching, the stitcher unit 205 encounters variable resistance due to the contact with the material 91, 92 on the working surface W and the rotation speed K starts to vary, e.g. slow down or speed up, with respect to the retraction speed V1. Hence, the stitching speed V2 is not constant, may vary slightly over time and/or does not necessarily remain equal to the retraction speed V1.

As a result of the speed difference V4 between the stitching speed V2 and the drive speed V3, the first drive member 271 starts to move back and forth along the sliding element 273 at the second drive member 272. Said movement thus facilitates the absorption of the speed difference V4. The assembly 201 is provided with one or more sensors 275 for detecting the movement, speed difference V2 or position change X of the first drive member 271 with respect to the second drive member 272 and/or the sliding element 273. The control unit 208 is arranged for increasing or decreasing the drive speed V3 of the second drive member 272 in the stitching direction A in response to the detection signals of the one or more sensors 275 to compensate for the resistance variations and the resulting change in the stitching speed V2. The retraction speed V1 is changed accordingly to match the changes in the drive speed V3 and to keep the gap between the separator 4 and the stitcher unit 205 substantially constant. Consequently, variations in the stitching speed V2 can be compensated within the range of the sliding element 273.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to an apparatus 1, 101, 201 and a method for stitching, wherein the apparatus 1, 101 comprises a separator 4, 104 for in a separation position separating the leading end LE and the trailing end TE from a working surface W to form a separation space G, wherein the apparatus 1, 101, 201 comprises a stitcher unit 5, 205 with a stitcher foot 51, 251 to support the leading end LE and the trailing end TE from the separation space G and a stitcher head 53, 253 for stitching the leading end LE and the trailing end TE on the stitcher foot 51, 251 from outside the separation space G, wherein the apparatus 1, 101, 201 comprises a stitcher drive 7, 207 for driving the stitcher unit 5, 205, a separator drive 6, 106 for retracting the separator 4, 104 and a control unit 8, 208 to control the separator drive 6, 106 and the stitcher drive 7, 207 simultaneously such that, during the stitching, the separator 4, 104 is retracted in the stitching direction A ahead of the stitcher unit 5, 205.

The invention claimed is:

1. An apparatus for stitching a leading end of a tire component to a trailing end of the same or another tire component along a splice line above a working surface, which working surface is arranged to support the respective one or two tire components, wherein the apparatus comprises a separator for in a separation position separating the leading end and the trailing end from the working surface to form a separation space, wherein the apparatus comprises a stitcher unit with a stitcher foot that is arranged to support the leading end and the trailing end at the splice line from the separation space and a stitcher head that is arranged for stitching the leading end and the trailing end on the stitcher foot from outside the separation space, wherein the stitcher unit comprises a stitcher drive for driving the stitcher unit in a stitching direction along the splice line while the stitcher unit stitches the leading end to the trailing end and a separator drive that is coupled to the separator for retracting the separator in the stitching direction parallel to the splice line, wherein the apparatus further comprises a control unit that is operationally connected to and arranged to control the separator drive and the stitcher drive simultaneously such that, during the stitching, the separator is retracted in the stitching direction ahead of the stitcher unit.

2. The apparatus according to claim 1, wherein the control unit is arranged to control the stitcher drive to move the stitcher unit at a stitching speed in the stitching direction, wherein the control unit is arranged for controlling the separator drive during the stitching to retract the separator in the stitching direction at a retraction speed that is equal to or greater than the stitching speed of the stitcher unit.

3. The apparatus according to claim 1, wherein the stitcher head comprises a set of upper stitching wheels which are arranged to engage the leading end and the trailing end and to be driven at a rotation speed to pull the stitcher unit over said trailing end and said leading end along the stitching line at a stitching speed in the stitching direction.

4. The apparatus according to claim 3, wherein the stitcher drive comprises a first drive member that is arranged for holding the stitcher unit and a second drive member for holding the first drive member, wherein the stitcher drive further comprises a retraction drive for retracting the second drive member in the stitching direction at a drive speed, wherein the control unit is operationally connected to the separator drive and the retraction drive to retract the second drive member at a drive speed and to retract the separator at a retraction speed that is equal to the drive speed, wherein the first drive member is movable back and forth with respect to the second drive member in the stitching direction to absorb a difference in the stitching speed of the stitcher unit with respect to the second drive member as a result of variable resistance between the stitcher unit and the one or more tire components during the stitching, wherein the assembly is provided with one or more sensors for detecting such speed difference or the position of the first drive member with respect to the second drive member, wherein the control unit is arranged for controlling the drive speed of the second drive member to compensate for the difference in the stitching speed.

5. The apparatus according to claim 1, wherein the control unit is arranged to control the separator drive and the stitcher drive to keep the separator at a constant clearance ahead of the stitcher unit in the stitching direction during the stitching.

6. The apparatus according to claim 5, wherein the stitcher unit and the separator are arranged for not supporting the leading end and the trailing end at the clearance between the stitcher unit and the separator during the stitching.

7. The apparatus according to claim 5, wherein the clearance between the stitcher unit and the separator during the stitching is less than ten centimeters.

8. The apparatus according to claim 1, wherein the separator arranged for separating the leading end and the trailing end from the working surface over a separation distance in a normal direction perpendicular to the working surface, wherein the stitcher foot has a height in the same normal direction, wherein the separation distance is equal to or larger than the height of the stitcher foot.

9. The apparatus according to claim 1, wherein the separator is rigid.

10. The apparatus according to claim 9, wherein the separator is a bar or a strip.

11. The apparatus according to claim 9, wherein the separator drive is coupled to separator to retract the separator in the stitching direction in a translational movement.

12. The apparatus according to claim 1, wherein the separator is flexible.

13. The apparatus according to claim 12, wherein the separator is a flexible band that is arranged to be doubled back along the splice line.

14. The apparatus according to claim 13, wherein the separator drive is coupled to one end of the flexible band to retract the flexible band in the stitching direction by pulling in said one end of the flexible band.

15. The assembly of a tire building drum and an apparatus according to claim 1, wherein the working surface is the circumferential surface of the tire building drum or the outer surface of a further tire component supported on said circumferential surface of the tire building drum.

16. The assembly according to claim 15, wherein the tire building drum has an rotation axis, wherein the circumferential surface of the tire building drum extends concentrically around the rotation axis and wherein the splice line extends parallel to the rotation axis.

17. A method for stitching a leading end of a tire component to a trailing end of the same or another tire component along a splice line above a working surface, which working surface is arranged to support the respective one or two tire components, wherein the method comprises the steps of;
providing a separator;
separating the leading end and the trailing end with the separator in a separation position from the working surface to form a separation space;
providing a stitcher unit with a stitcher foot and a stitcher head;
supporting the leading end and the trailing end with the stitcher foot at the splice line from the separation space and stitching the leading end and the trailing end on the stitcher foot with the stitcher head from outside the separation space;
driving the stitcher unit in a stitching direction along the splice line while the stitcher unit stitches the leading end to the trailing end; and
retracting the separator ahead of the stitcher unit in the stitching direction.

18. The method according to claim 17, wherein the separator is retracted in the stitching direction at a retraction speed and wherein the stitcher unit is moved in the stitching direction at a stitching speed, wherein the separator is retracted with a retraction speed that is at least equal to or greater than the stitching speed.

19. The method according to claim 17, wherein the stitcher head comprises a set of upper stitching wheels which engage the leading end and the trailing end and are driven at a rotation speed to pull the stitcher unit over said trailing end and said leading end along the stitching line at a stitching speed in the stitching direction.

20. The method according to claim 19, wherein the stitcher drive comprises a first drive member that holds the stitcher unit and a second drive member that holds the first drive member, wherein the second drive member is retracted in the stitching direction at a drive speed and the separator is retracted in the stitching direction at a retraction speed that is equal to the drive speed, wherein the first drive member is moved back and forth with respect to the second drive member in the stitching direction to absorb a difference in the stitching speed of the stitcher unit with respect to the second drive member as a result of variable resistance between the stitcher unit and the one or more tire components during the stitching, wherein such speed difference or the position of the first drive member with respect to the second drive member is detected and the drive speed of the second drive member is controlled to compensate for the difference in the stitching speed.

21. The method according to claim 17, wherein the separator is kept at a constant clearance ahead of the stitcher unit in the stitching direction during the stitching.

22. The method according to claim 21, wherein the leading end and the trailing end are unsupported at the clearance between the stitcher unit and the separator during the stitching.

23. The method according to claim 21, wherein the clearance between the stitcher unit and the separator during the stitching is less than ten centimeters.

* * * * *